United States Patent [19]

Yabushita et al.

[11] Patent Number: 5,600,061

[45] Date of Patent: Feb. 4, 1997

[54] APPARATUS FOR DETECTING AND STORING DATA REPRESENTATIVE OF SHOCK IMPARTED TO VEHICLE DURING TRAVEL

[75] Inventors: Shuichi Yabushita, Yokohama; Shinsuke Miura, Mishima, both of Japan

[73] Assignee: Yamaichi Electronics Co., Ltd., Tokyo, Japan

[21] Appl. No.: 513,111

[22] Filed: Aug. 9, 1995

[30] Foreign Application Priority Data

Aug. 11, 1994 [JP] Japan .................................. 6-210653

[51] Int. Cl.⁶ .................................................... G01C 21/00
[52] U.S. Cl. ............................................ 73/178 R; 73/514.02
[58] Field of Search ............................. 73/514.01, 514.02, 73/178 R; 340/988, 990, 991, 996

[56] References Cited

U.S. PATENT DOCUMENTS

| | | | |
|---|---|---|---|
| 4,405,986 | 9/1983 | Gray | 364/434 |
| 4,758,959 | 7/1988 | Thoone et al. | 73/178 R |
| 5,109,346 | 4/1992 | Wertz | 364/459 |
| 5,353,023 | 10/1994 | Mitsugi | 340/990 |

*Primary Examiner*—Richard Chilcot
*Assistant Examiner*—Max Noori
*Attorney, Agent, or Firm*—Wenderoth, Lind & Ponack

[57] ABSTRACT

A shock generating position storage unit includes an acceleration sensor for detecting an impulsive wave or shock applied to a vehicle during transportation thereof, a storage unit for storing data representative of such impulsive wave or shock, and a global positioning system (GPS) for determining a position of the vehicle along a travel path based on a radio wave received from an artificial satellite. Data of the travel position at a time when data of the impulsive wave or shock detected by the acceleration sensor exceeds a predetermined minimum value is sent to the storage unit from the GPS at the same time the impulsive wave or shock data is sent thereto.

9 Claims, 5 Drawing Sheets

APPARATUS FOR DETECTING AND STORING DATA REPRESENTATIVE OF SHOCK IMPARTED TO VEHICLE DURING TRAVEL

BACKGROUND OF THE INVENTION

Field of the Invention

This invention relates to an apparatus for detecting and storing data representative of a shock due to an impart imparted to a vehicle during travel thereof, including magnitude of the shock and the time and position at which the shock occurred.

As disclosed in Japanese Laid-Open Patent Application No. Sho 55-131774, there is known a device or unit capable of storing data of magnitude and time of generation of a shock imparted to a transportation cargo during transportation thereof. In this prior art arrangement, the storage unit is removed from a transportation means such as a vehicle after transportation and is connected to a personal computer so that the data can be analyzed and the results can be used for various purposes such as determining shortcomings of current transportation conditions, improvement of future transportation conditions, and the like.

The above-mentioned storage unit can easily provide data of magnitude of a shock and the time at which the shock has occurred. Although such data easily can be obtained, it is difficult to determine a specific place along the transportation path of a vehicle where the shock has occurred. Therefore, such above-mentioned conventional device cannot be used for the purpose of determining, for example, the conditions of a road surface by specifying the place therealong at which a shock-generating condition exists.

When it is attempted to determine the position where the shock has occurred from the time at which the shock has occurred, there is no other way than to guess the position where the shock has occurred based on the speed of travel of the vehicle, etc., and the time at which the shock has occurred. Since the traveling speed itself is not clearly known, it is difficult to specify the position on a map where a harmful shock has occurred. Therefore, it is not possible to determine accurately a specified position whereat repair of a road surface or the like is necessary.

SUMMARY OF THE INVENTION

It is, therefore, an object of the present invention to provide a shock generating position storage unit which is capable of solving the above-mentioned problems inherent in the prior art.

In order to achieve the above object, there is essentially provided an apparatus including an acceleration sensor for detecting an impulsive wave or shock imparted to a transportation device during travel thereof along a transportation path, a storage unit for storing information representative thereof, and a global positioning system (GPS) for determining a position of the vehicle along the path based on a radio wave received from an artificial satellite. Data representative of the position of the vehicle at the time when data of the impulsive wave or shock detected by the acceleration sensor exceeds a predetermined minimum acceleration value is sent to the storage unit from the GPS. At the same time the impulsive wave or shock data is sent to the storage unit. The apparatus may further include a device for writing the data of the position where the shock occurred and the impulsive wave or shock data onto a map.

According to the present invention, when the acceleration sensor detects an impulsive wave or shock which has exceeded a predetermined minimum acceleration value, data representative of such detected impulsive wave or shock and data representative of the position along the travel path where the shock has occurred are stored in the storage unit. In this way, the position where the shock has occurred, the magnitude of the shock and the time at which the shock occurred are obtained as one information.

Obtaining only information as to magnitude of the shock and time at which the shock occurred is not sufficient for effective use. However, by additionally storing the data of the position on the map at which the shock occurred, such total data or information can be used as a basis for improving conditions of transportation and conditions of the road surface of the path. Thus, the apparatus of the present invention can fully function as a shock information storage unit.

The above and other objects and attendant advantages of the present invention will be apparent to those skilled in the art from the following description and claims, taken in conjunction with the accompanying drawings which constitute part of this specification.

DETAILED DESCRIPTION OF THE EMBODIMENT

Figure 2:
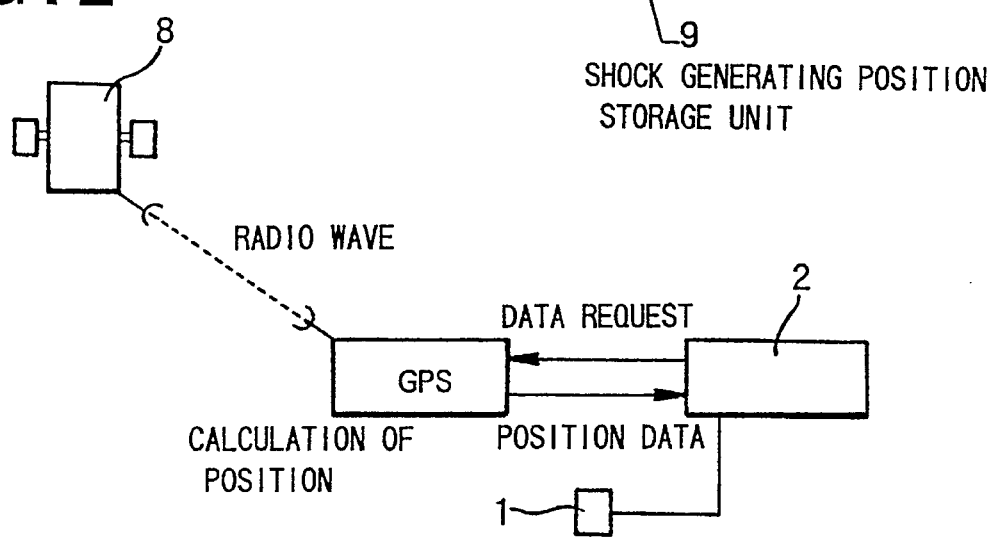
FIG. 2 is a block diagram illustrating the principle of use thereof.
Figure 3:
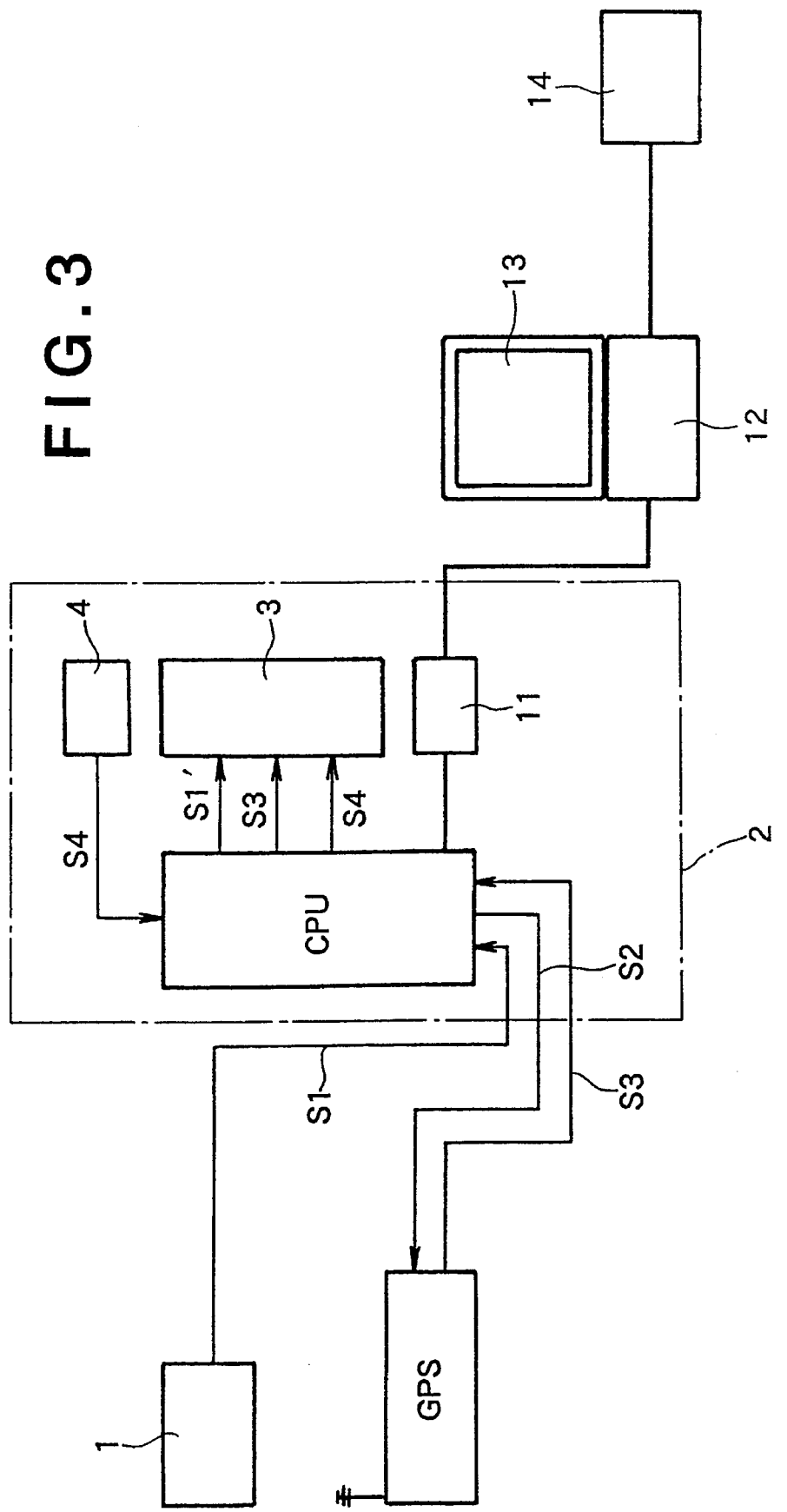
FIG. 3 is a diagram of one embodiment of a circuit thereof.
Figure 4:
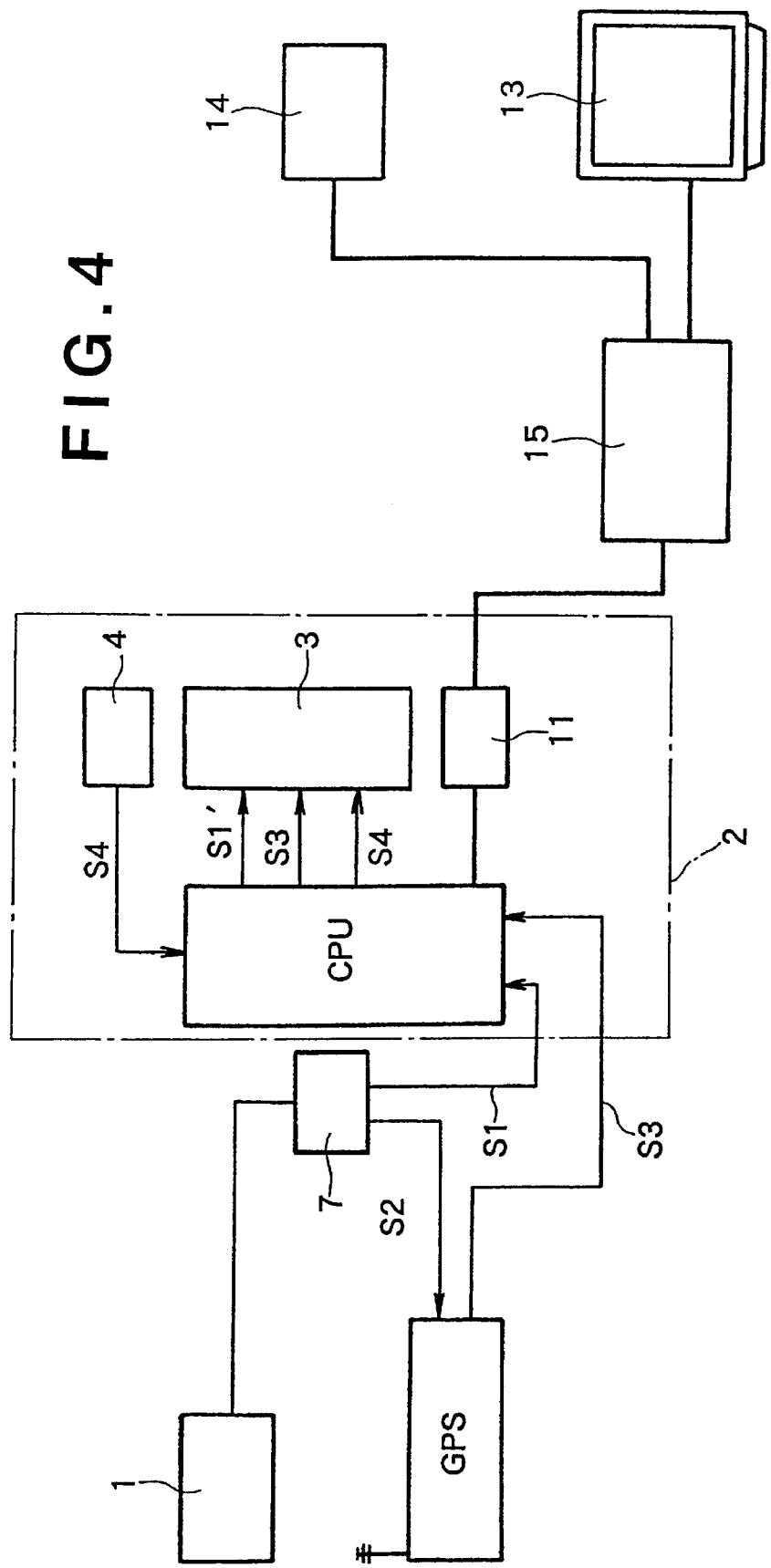
FIG. 4 is a diagram of another embodiment of a circuit thereof.
Figure 7:
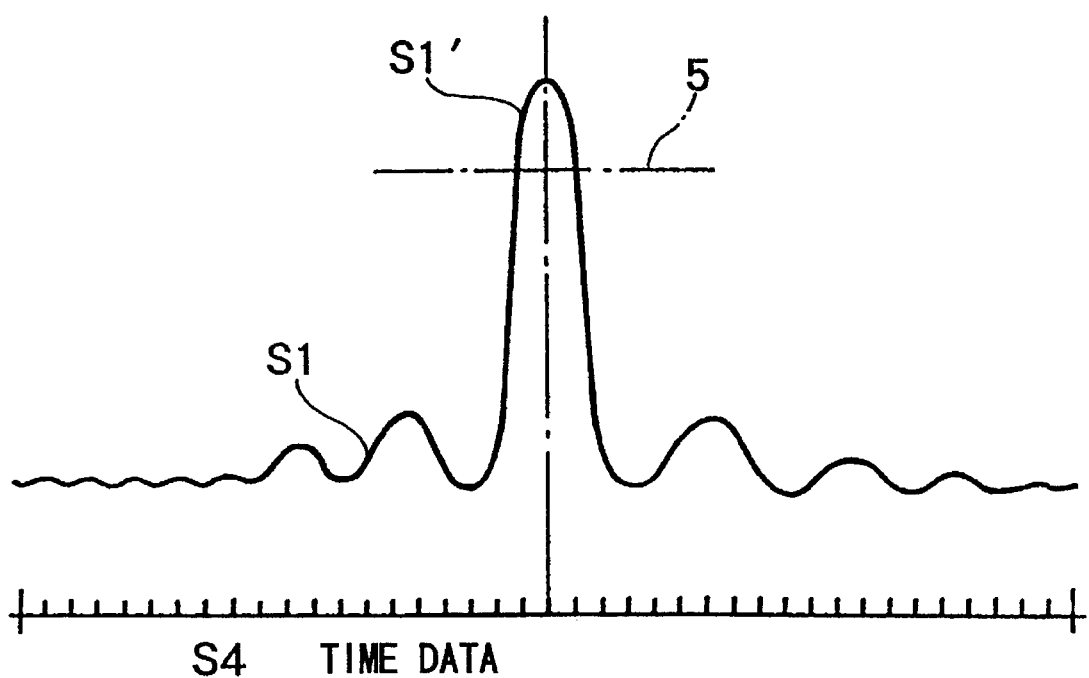
FIG. 7 is a graph of a waveform of an impulsive wave.

In the drawings, reference numeral 1 denotes an acceleration sensor for detecting an impulsive wave or shock imparted to a transportation device 6, such as a motor vehicle, a ship, an aircraft, etc., during travel thereof over a path, e.g. a road. As shown in FIGS. 3 and 4, an impulsive waveform (analog signal) generated by the acceleration sensor 1 is converted to a digital signal (impulsive wave data), e.g. by an AD converter, and this signal S1 is input into a CPU of a storage unit 2. When the input impulsive wave or shock data S1 exceeds a predetermined minimum value, indicative of a detected shock of not less than a predetermined value, e.g. due to passing over a step or bump in the road, the CPU outputs, as shown in FIG. 3, a position data request signal S2 to a global positioning system (GPS). In accordance with this instruction, the GPS outputs, as shown in FIG. 2, a position data S3 that is stored in a memory 3 of the storage unit 2 as stored data. Also supplied to memory 3 as stored data is impulsive wave or shock data S1' which has exceeded the predetermined minimum value. The CPU transmits the position data S3 to the memory 3 for storage therein, together with the impulsive wave or shock data S1' of a magnitude exceeding a threshold value 5 (i.e. exceeding the predetermined minimum value) among all impulsive wave data S1, as shown in FIG. 7. Data in the vicinity of the threshold value 5 may be stored together with the data which has exceeded the threshold value 5. Accordingly, the CPU has the function of discriminating and sending the impulsive wave or shock data S1' to be stored and also the function of issuing the position data request signal to the GPS when the CPU discriminates impulsive wave data S1'. Also, the CPU transmits time data S4 of the time at which the impulsive wave or shock data S1' occurred from a timer 4 to the memory 3 for storage together with the impulsive wave or shock data S1' and the position data S3.

In FIG. 4, there is illustrated a discrimination circuit 7 for discriminating the impulsive wave or shock data S1' and issuing the position data request signal to the GPS when the impulsive wave or shock data S1' is discriminated, the discrimination circuit 7 being provided on the output side of the acceleration sensor 1 separately from the CPU.

Figure 1:
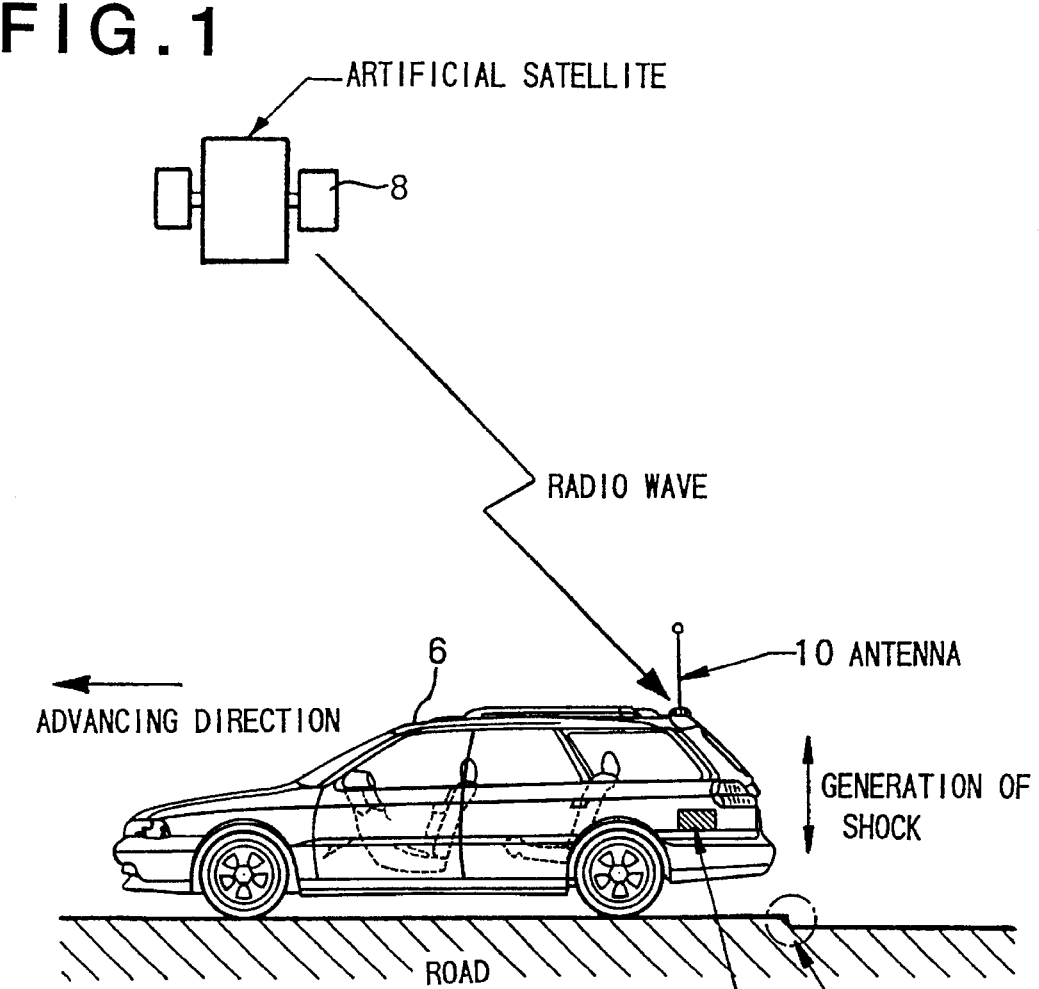
FIG. 1 is a schematic side view illustrating application of a shock generating position storage unit according to an embodiment of the present invention.

The GPS of FIGS. 3 and 4 is a device, as shown in FIGS. 1 and 2, for receiving a radio wave coming from an artificial satellite 8 and calculating latitude and longitude to specify a current traveling position of the vehicle, or the latitude, longitude and altitude. The device is utilized as a navigation system in vehicles. Since such device itself is a known system, detailed description thereof is omitted.

A shock generating position storage unit 9 including the acceleration sensor 1, the GPS and the storage unit 2 shown in FIGS. 3 and 4 is mounted in the transportation device 6 such as the vehicle as shown in FIG. 1. An antenna 10 of the GPS is provided on the vehicle.

The impulsive wave or shock data S1' and position date S3 stored in the shock generating position storage unit 9, as well as the time data S4, can be extracted from the memory 3 by a data reading device 12 connected to the storage unit 2 through an interface 11 Thereby, the data S1', S3 and S4 can be displayed in the form of numerical values in a display unit 13, or they can be printed out by a printer 14, for analysis. At such time, the data may be appropriately totalized or ranked by the data reading device 12. There may be provided a function for arranging the results in order, e.g. of the size or magnitude of the impulsive wave data, so that they are displayed together with other data or shown in a graph.

Figure 5:
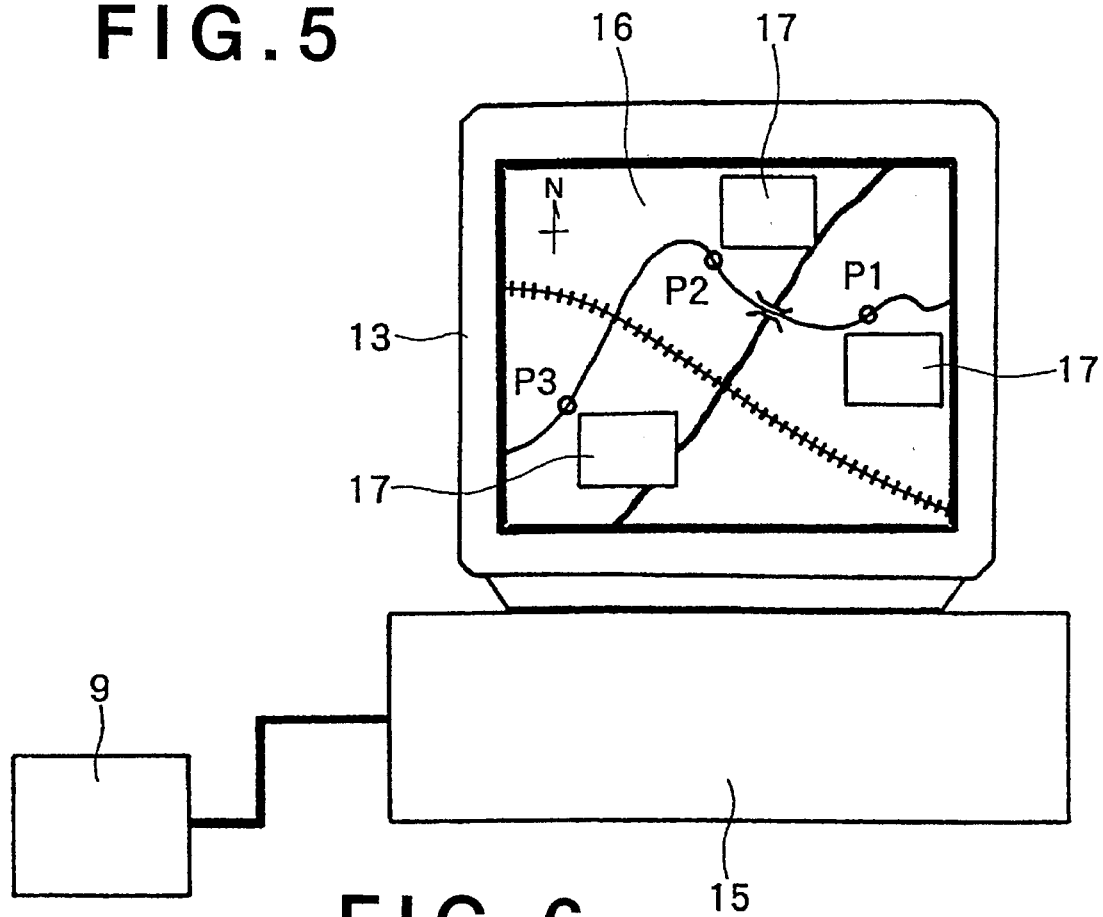
FIG. 5 is a front view of a writing device thereof.
Figure 6:
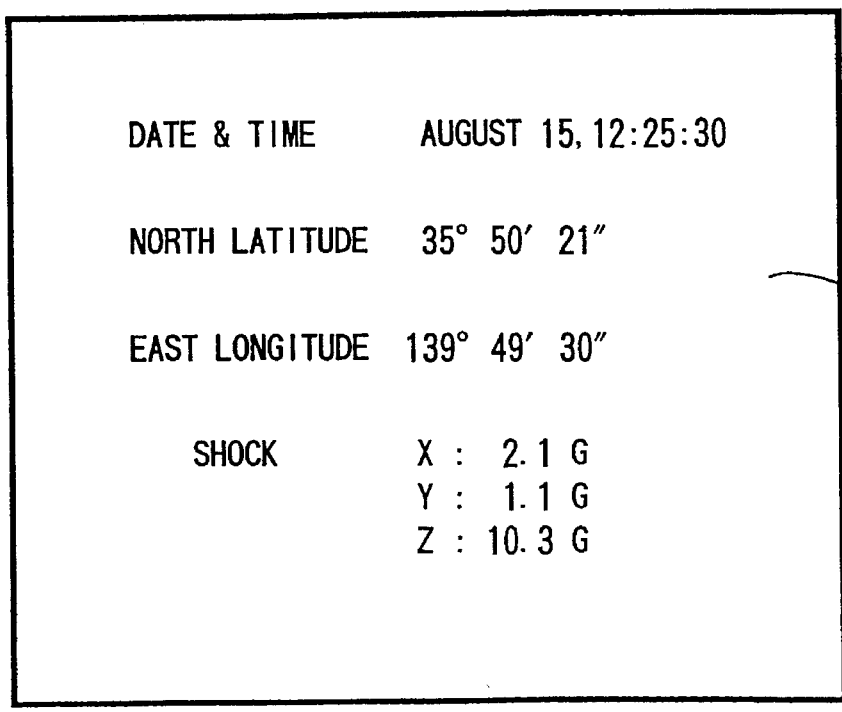
FIG. 6 is a representation exemplifying data displayed in a monitor of the writing device.

FIG. 4 shows other features of the present invention. This embodiment comprises, as previously mentioned, an acceleration sensor 1 for detecting a shock applied to a transportation device during the travel thereof, a storage unit 2 for storing shock information, and a global positioning system (GPS) for receiving a radio wave from an artificial satellite 8 and determining a traveling position of the transportation device based on such received radio wave. When a shock detected by the acceleration sensor 1 has exceeded a predetermined minimum value, position data (at the time when the shock occurred) from the GPS is transmitted for storage into the memory 3 of the storage unit 2, together with the impulsive or shock data S1' which has exceeded the predetermined minimum value. In addition, this embodiment includes a writing device 15 for writing the position data S3 (where the shock has occurred) and the impulsive or shock data S1' on a map. The writing device 15 is connected the storage device 2 through interface 11. The writing device 15 extracts the impulsive or shock data S1' and position data S3 together with the time data S4 from the memory 3 and combines such data with map data (map software) stored in the writing device 15. Then, as shown in FIGS. 5 and 6, the writing device 15 displays a map 16 showing the traveling path in the display unit 13. At that time, positions or points P1 to P3 where detected shocks of not less than a predetermined magnitude have occurred along the traveling path are also displayed. In addition, impulsive position data at each position P1 to P3, such as latitude, longitude, time and date of occurrence of shock, impulsive value (G value), etc., are displayed on, e.g. respective monitors 17.

A personal computer can be employed as the writing device 15 or the data reading device 12.

According to the present invention, there can be provided a device in which, when the acceleration sensor detects an impulsive wave or shock of not less than a predetermined minimum magnitude value, data representative of the impulsive wave or shock and of the position along a traveling path where the shock occurred are stored therein. In this way, the position where the shock has occurred, the magnitude of the shock and the time at which the shock occurred are obtained as one information.

As previously mentioned, only information as to magnitude of the shock and time at which the shock occurred is not sufficient for effective use. However, by additionally storing information of the position at which the shock occurred, such total information can be used as a basis for improving conditions of transportation and conditions of the road surface. Thus, the storage unit of the present invention can provide such information accurately.

While preferred embodiments of a shock generating position storage unit according to the present invention have been described with reference to the drawings, it should be borne in mind that such embodiments are merely illustrative of the gist of the present invention and are accordingly subject to modification and change.

What is claimed is:

1. An apparatus for detecting shocks imparted to a motor vehicle during travel thereof over a transfer path and for storing data representative of the shocks, said apparatus comprising:

a storage unit including a memory;

a global positioning system operable to determine a position of the vehicle along said path;

a shock sensor for detecting shocks imparted to the vehicle during travel thereof over the path and for generating shock data representative of magnitude of the shocks;

means for, when said shock data exceeds a predetermined minimum value indicative of a detected shock of not less than a predetermined magnitude, operating said global positioning system to determine the position of the vehicle along the path when said detected shock occurred and generating position data representative thereof;

a timer in said storage unit to generate time data representative of the time when said detected shock occurred; and means for sending said shock data exceeding said predetermined minimum value, said position data and said time data to said memory.

2. An apparatus as claimed in claim 1, wherein said means for operating said global positioning system comprises a CPU of said storage unit operable to discriminate when said shock data has exceeded said predetermined minimum value and to send a signal to said global positioning system to initiate operation thereof.

3. An apparatus as claimed in claim 2, wherein said sending means comprises said CPU.

4. An apparatus as claimed in claim 1, wherein said sending means comprises a CPU of said storage unit.

5. An apparatus as claimed in claim 4, wherein said means for operating said global positioning system comprises a discrimination circuit connected to an output of said shock sensor separate from said CPU and operable to discriminate when said shock data has exceeded said predetermined minimum value and to send a signal to said global positioning system to initiate operation thereof.

6. An apparatus as claimed in claim 1, further comprising a reading device connected to said memory and operable to extract therefrom said shock data exceeding said predetermined minimum value, said position data and said time data.

7. An apparatus as claimed in claim 6, further comprising a display device connected to said reading device and operable to display the thus extracted data.

8. An apparatus as claimed in claim 1, further comprising a writing device operably connected to said memory for writing on a map display information corresponding to said position data.

9. An apparatus as claimed in claim 1, further comprising a writing device operably connected to said memory for writing on a map display information corresponding to said shock data exceeding said predetermined minimum value, said position data and said time data.

* * * * *